May 10, 1960 S. P. JACKSON ET AL 2,936,409

CURRENT RECTIFIER ASSEMBLIES

Filed Dec. 13, 1956 2 Sheets-Sheet 1

Inventors :
Stuart P. Jackson
Harold H. Power
by Richard E. Hosley
Their Attorney

CURRENT RECTIFIER ASSEMBLIES

Filed Dec. 13, 1956

2 Sheets-Sheet 2

Inventors :
Stuart P. Jackson
Harold H. Power
by Richard E. Hosley
Their Attorney United States Patent Office 2,936,409

Patented May 10, 1960

2,936,409

CURRENT RECTIFIER ASSEMBLIES

Stuart P. Jackson, Lynn, Mass., and Harold H. Power, Newfield, Maine, assignors to General Electric Company, a corporation of New York Application December 13, 1956, Serial No. 628,115

8 Claims. (Cl. 317—234)

Figure 1:
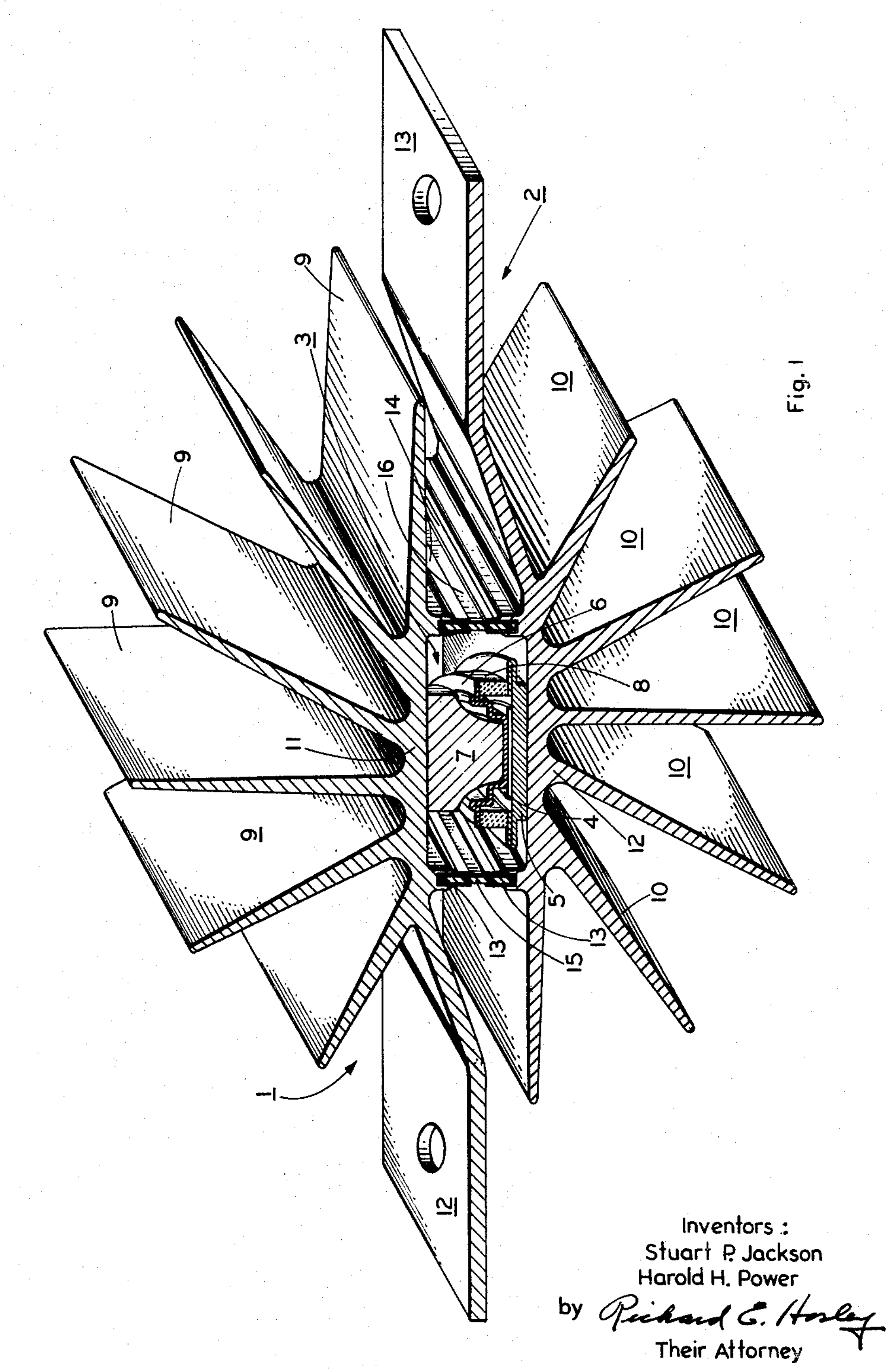

The present invention relates to improved current rectifier assemblies and, more particularly, to fluid-cooled broad-area rectifiers wherein dissipation of heat losses is enhanced and contamination minimized.

Current rectifiers including relatively large area contact surfaces upon wafers of semiconductor materials are remarkable for their ability to pass extraordinarily large currents unidirectionally. Such rectifiers are of small size, operate with very high efficiencies, demand virtually no servicing, and possess other advantages characteristic of wholly static electrical devices. However, cells having current-conducting capacities which are large in relation to their physical sizes or thermal masses will tend to overheat and become destroyed unless the heat losses are dissipated at the rates at which they are generated. Heat-radiating fins have thus come into use with such cells, these fins being disposed to provide the necessary heat transfers to circulated cooling media. In common industrial applications, however, atmospheric contaminants, corrosive fumes and fluids, dust, and the like, nevertheless tend to interfere with proper heat dissipation characteristics through fouling and erosion.

Some relief from deleterious effects upon the rectifier cells themselves by the destructive agents in cooling media may be realized through hermetic sealing techniques. Hermetic sealing generally involves joints which are mechanically delicate, as well as insulating members which are likely to become damaged under stress and strain. Therefore, it is necessary that the electrical bus connections to sealed rectifier cells, and the heat-radiating elements associated with the cell surfaces, avoid imposing severe mechanical loads upon them.

Despite the most extensive precautions taken to limit fouling of rectifier air-cooling systems, clogging conditions ultimately dictate cleaning to restore optimum heat dissipation. Ready access to contaminated areas must thus be provided, such that shut-down intervals are minimized and it is further desirable that the parts lend themselves to simple cleaning operations. Although the intervals between cleanings are in part determined by the contaminants present in ambient atmospheres in which the rectifier equipment may be installed, the entry of contaminants into critical areas should obviously be prevented to the greatest possible extent while nevertheless permitting adequate air circulation for cooling purposes.

Accordingly, it is one of the objects of the present invention to provide an improved rectifier assembly which dissipates heat losses efficiently and which resists fouling by contaminants.

Further, it is an object to provide a rectifier assembly wherein heat-dissipating elements provide electrical bus connections and wherein sensitive cells are isolated from mechanical loads.

In addition, an object is the provision of improved air-cooled rectifier apparatus having reduced tendencies to clog and affording ready access to simply-cleaned cooling members.

By way of a summary account of this invention in one of its aspects, we provide a germanium rectifier wafer sandwiched between conductive contacts and hermetically sealed within an enclosure including an insulating member sealed with the contacts, and we affix in conductive relationship to each of the opposite sides of this sealed unit a relatively massive heat-radiating member of generally hemicylindrical outline. Each of these like heat-radiating members is provided with integral substantially planar fins which are essentially parallel with the principal longitudinal axes of their hemicylindrical outlines, and one fin of each of these members extends outwardly for a greater distance than the others in the manner of a bus bar, to which another electrical bus bar may be fastened. The rectifier cell is sandwiched between the two heat-radiating members, the general outline of the finned assembly thus being cylindrical, and insulating spacer members maintain an optimum spacing between the finned members such that the cell remains mechanically unstressed. This assembly is disposed within a hollow cylindrical plastic conduit through which cooling air is drawn, the conduit being formed of two hemicylindrical halves clamped together and in a holding relationship with the longer fins of the heat-radiating members.

Figures 2, 3:
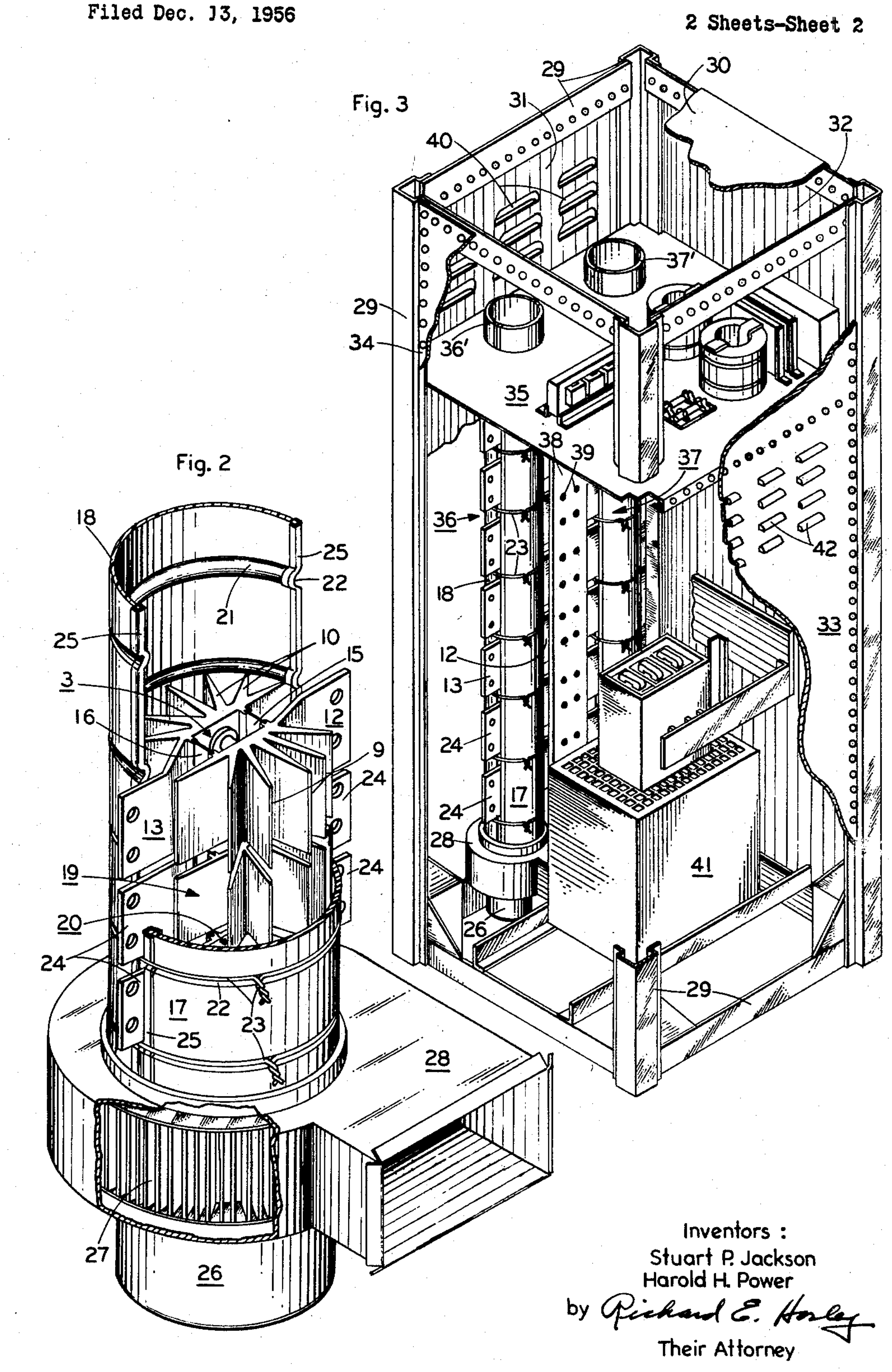

Although the features of this invention which are believed to be novel are expressed in the appended claims, details of the invention and the further objects and advantages thereof may be most readily comprehended through reference to the following description taken in connection with the accompanying drawings, wherein:

Figure 1 illustrates a half cross-section of a heat-dissipating rectifier cell assembly constructed in accordance with these teachings;

Figure 2 portrays a number of rectifier cell assemblies in association with a cooperating air duct and blower; and Figure 3 depicts a cut-away rectifier console with air-cooling provisions which minimize fouling.

With reference to the assembly of Figure 1, it will be perceived that two like heat-dissipating members 1 and 2 are disposed in intimate electrical and heat-transferring relationships with opposite electrodes of a hermetically-sealed rectifier cell 3. This cell includes a semiconductor wafer 4 sandwiched between a metallic disk electrode 5 and a metallic cylindrical cup 6 to which a massive conductive connector 7 is affixed by soldering. A hollow cylindrical ceramic member 8 completes the sealed enclosure for wafer 4 through soldered connections with disk 5 and cup 6 along metallized surfaces. Fabrication of such sealed cells is further detailed in U.S. Patent No. 2,756,374, assigned to the same assignee as that of the present application.

Each of the heat-dissipating members 1 and 2 is of a generally hemicylindrical outline, although the outlines are defined by ends of fins, 9 and 10, respectively, rather than by continuous surfaces. Fins 9 and 10 are substantially planar and radiate outwardly at different angles from the substantially planar base portions 11 and 12 of members 1 and 2, respectively, each of the fins being of a generally rectangular outline and lying parallel with the major axis of the hemicylindrical outlines. Members 1 and 2 each further include one fin extension, 12 and 13, each of which serves as a conducting bus bar and affords coupling to a circuit bus bar.

The heat-dissipating members 1 and 2 are conveniently formed by extrusion with the illustrated cross-sectional configuration, the long extruded members being cut transversely to the desired shorter lengths. Only one form of extrusion is required, since both finned halves of each assembly are identical. Relatively light weight is realized through use of aluminum extrusions, and corrosion resistance and solderability are optimized by the plating of another conducting material, such as silver, over the aluminum surfaces. Good solderability is desired for the soldered junctions between connector 7 and base portion 11 and between disk electrode 5 and base portion 12, as well as for the soldered junctions 13 and 14 between members 1 and 2 and the parallel insulating spacers 15 and 16. Flat rectangular insulators 15 and 16 are of a printed circuit board construction wherein the edges possess conductive coatings while the intermediate surfaces are rendered non-conducting by etching. As may be perceived through reference to the drawing of Figure 1, the coated edges of these insulators are received in accommodating channels extruded as part of the members 1 and 2. When fixed into the illustrated positions by soldering, the insulating spacer members 15 and 16 maintain an accurate spacing of the heat-dissipating members such that severe stresses and strains cannot be imposed upon the hermetically sealed cell 3. Spacers 15 and 16 are disposed in alignment with the direction of flow of the cooling air, as are fins 9 and 10, whereby maximum cooling effects are achieved.

Provisions for further mounting, insulating and ducting are shown in Figure 2 together with suitable circulating apparatus. The rectifier unit of Figure 1 is there pictured uppermost in the hollow cylindrical plastic duct having the two like substantially hemicylindrical halves 17 and 18. Two additional rectifier units, 19 and 20, are illustrated also, the three units being axially aligned inside the cooling duct. Axial spacing between rectifier units is preferably preserved, for heightened cooling effects and, principally, for electrical isolation of the rectifier units. Such spacing is aided by the spaced annular ridges 21 which project inwardly to prevent axial displacement of the rectifier fins and yet provide corresponding depressions 22 on the outside of the duct in which clamping wires 23 may rest. The axial spacing is sufficient to prevent clamping wires 23 from contacting and shorting the bus-like extensions 12, 13, and 24 of the rectifier units. Insulation, stress distribution, and sealing of the assembly are further aided by the rubber channel-shaped stripping 25 applied to the edges of the duct halves, the stripping being compressed when the clamping wires are tightened, by twisting, to fix the various parts in position.

Cooling air is drawn through the ducting past the rectifier unit cooling members by a blower unit including an electric motor 26, a fan 27 driven by the motor, and auxiliary sheet-metal ducting 28 which joins the aforesaid plastic ducting. Circuit bus bars are readily clamped to and unclamped from the bus-type extensions of the rectifier units, and the plastic ducting is not only simply assembled but may also be readily separated by clipping or otherwise removing clamping wires 23. Once access is had to the interior of the assembly, the duct halves may be easily cleaned of accumulated contamination, as may the rectifier cooling surfaces as well.

The cooled rectifier units customarily form but one part of a completed power pack further including transformers, capacitors, reactors, fuse elements, and the like. Some measure of cooling must be afforded these additional components, while yet providing protection against fouling. In Figure 3, there is illustrated a console wherein such components are housed together with cooled rectifier equipment, and wherein heat-transfer and protection against ambient atmospheric conditions are optimized. This console of rectangular parallelogram outline includes frame members 29 to which sheet-metal cover plates or panels are fastened on all sides except the bottom. The top panel or end plate 30 is completely closed, such that foreign matter is wholly excluded, this solid top being important because contaminants tend to settle or drip downwardly in many industrial sites of such rectifier apparatus. One or more of the side panels 31, 32, 33, and 34 is louvered to facilitate entry and egress of cooling air in a particular manner, and a horizontal baffle plate 35 is disposed at a certain level to divide the console into two chambers, one for intake and another for exhaust. A pair of ducts, 36 and 37, with the aforesaid blower and rectifier units disposed for cooling and electrical coupling, are shown in a vertical orientation within the console of Figure 3. One circuit bus bar, 38, is pictured clamped to certain of the bus-bar terminals by bolts 39, and it will be understood that other bus bars will likewise be employed to complete circuit couplings.

Louvers 40 in upper portion of panel 31 admit air from outside the console into the upper chamber between the top panel 30 and the partitioning plate 35, and such air is drawn downwardly through plastic ducts 36 and 37 by way of their open upper ends 36' and 37' which project through partition 35. The stream of coolant is thus drawn past the enclosed rectifier units and heat from these is efficiently released to the stream which is thereafter expelled by blowers, such as that operated by motor 26, into the lower chamber beneath partition 35. This discharge may be through a duct-like enclosure 41 for transformer or other apparatus requiring particularly effective cooling. Other components within the console also tend to be cooled by the forced air before it is exhausted through the louvers 42 in panel 33, particularly where the bottom of the console is closed, either by flooring upon which it is mounted or by a further panel, and if louvers 42 are near the upper part of the lower chamber, as illustrated. With this arrangement, the cooling air is first drawn downwardly at high velocity through the ducts 36 and 37 and then rises for egress through louvers 42.

The total area of the air intake openings afforded by louvers 40 is designed to be several times the area of the open ends of ducts 36 and 37 such that air velocities in the vicinity of the louvers are far lower than those through the ducts. As the intake velocity is lowered in this manner, the tendency of the air stream to pick up unwanted air-borne dirt particles from the ambient atmosphere is very advantageously reduced. Because of the relatively massive construction of the heat-dissipating fins of the rectifier units within the ducts, the flow areas are further restricted, and air velocities past the fin surfaces are thus caused to be particularly high and to occasion greater heat transfers. In one design, for example, the intake louver area was about 137 square inches and the duct area about 38 square inches, such that the cooling air entering the console had a velocity less than that through the ducting governed by a factor of 3.5. The rectifier cell and fin cross-sections further reduced the area in portions of the ducting to about 30 square inches, such that the air velocity across the heat-dissipating fin surfaces was about four and one-half times the entrance velocity.

Intake louvers 40 and exhaust louvers 42 are preferably disposed in opposite panels, such that the same air will not tend to be recirculated. In many installation environments, corrosive fluids are exposed at low levels, and the console intake is desirably situated at a higher position where corrosive fumes will not be readily drawn into the cooling system.

Our teachings may be employed to advantage particularly with semiconductor rectifiers of the germanium or silicon type. Those skilled in the art will appreciate that the sealed rectifier cells which are to be cooled may be of constructions somewhat different from that selected for illustration here, and that the heat-radiating fins may be of different numbers. Accordingly, it will be understood that while particular preferred embodiments of this invention have been shown and described herein, various changes and modifications can be accomplished without departing either in spirit or scope from our invention as set forth in the appended claims.

What we claim as new and desire to secure by Letters Patent of the United States is:

1. Current rectifier apparatus comprising a plurality of rectifier cell assemblies each including a unilaterally conductive cell having oppositely disposed electrical contacts, a pair of like relatively massive heat-dissipating conductive members each having a base portion and a plurality of substantially planar heat-disspiating fins fixed with and projecting outwardly from said base portion and all extending laterally in one direction, means electrically connecting said base portion of each of said members with a different one of said contacts such that said cell is sandwiched intermediate said base portions and such that said outwardly projecting fins of said members extend laterally in the same direction, insulating spacer means fixed with said members and maintaining said base portions in a spaced relationship precluding severe mechanical stresses on said cell by said members, and means for making electrical circuit connections with said cell contacts through said conductive members; a hollow duct of insulating material disposed in a surrounding and holding relationship with each of cell assemblies; and means forcing air through said duct past said rectifier cell assemblies; said duct holding said cell assemblies with all of said fins parallel to the flow of air through said duct.

2. Current rectifier apparatus comprising a plurality of rectifier cell assemblies each including a unilaterally conductive cell having oppositely disposed electrical contacts, a pair of relatively massive heat-dissipating conductive members each of generally hemicylindrical outline formed by a base portion and a plurality of angularly-displaced heat-radiating fins fixed with said base portion substantially parallel with the longitudinal axis of said outline, means electrically connecting said base portion of each of said members with a different one of said contacts such that said cell is sandwiched intermediate said base portions of said members and such that the outline of said connected members is substantially cylindrical, and means for making electrical circuit connections through said conductive members; a hollow substantially cylindrical duct of insulating material disposed in a surrounding coaxial relationship with each of said rectifier cell assemblies; and means forcing a cooling medium through said duct and past said rectifier cell assemblies.

3. Current rectifier apparatus comprising a plurality of rectifier cell assemblies each including a unilaterally conductive cell having oppositely disposed electrical contacts, a pair of relatively massive heat-dissipating conductive members each having a base portion and a plurality of substantially planar heat-dissipating fins integral with and projecting outwardly from said base portion, said fins and base portion of each of said members forming a substantially hemicylindrical outline and said fins being substantially parallel with the longitudinal axis of said outline, means electrically connecting said base portion of each of said members with a different one of said contacts such that said cell is sandwiched intermediate said base portions of said members and such that the outline of said connected members is substantially cylindrical, insulating spacer means fixed with said members and maintaining said base portions in a spaced relationship precluding severe mechanical stresses on said cell by said members, and means for making electrical circuit connections with said cell contacts through said conductive members; a hollow cylindrical duct of insulating material surrounding and holding said assemblies in a coaxial relationship; and means forcing air through said duct and past said rectifier cell assemblies.

4. Current rectifier apparatus comprising a plurality of recifier cell assemblies each including a unilaterally conductive cell having oppositely disposed electrical contacts and means intermediate said contacts hermetically sealing said cell, a pair of like extruded heat-dissipating members of conductive material each having a base portion and a plurality of substantially planar heat-dissipating fins integral with and projecting outwardly from said base portion at different angles, means electrically connecting said base portion of each of said members with a different one of said contacts such that said cell is sandwiched intermediate said base portions, said fins being of dimensions to impart a substantially right cylindrical general outline to the connected cell and members, and one of said fins of each of said members projecting outwardly beyond said outline to afford electrical bus connections at diametrically opposite positions, and insulating spacer means fixed with said base portions providing fixed spacing between said base portions to prevent mechanical stressing of said sandwiched sealed cell; a pair of substantially hemicylindrical hollow duct halves of insulating material; means clamping said duct halves about said rectifier cell assemblies to hold said assemblies in axially spaced relationships therewithin with said one fins projecting outwardly between said duct halves; blower means coupled with said clamped duct halves forcing air therethrough past said rectifier cell assemblies, and electrical circuit bus bars coupled with said one fins of said cell assemblies which project outwardly of said duct halves.

5. Current rectifier apparatus comprising a plurality of rectifier cell assemblies each including a unilaterally conductive cell having oppositely disposed electrical contacts, a pair of like extruded heat-dissipating conductive members each having a base portion and a plurality of substantially planar heat dissipating fins fixed with and projecting outwardly from said base portion and all extending laterally in one direction, means electrically connecting said base portion of each of said members with a different one of said contacts such that said cell is sandwiched intermediate said base portions and such that said outwardly projecting fins of said members extend laterally in the same direction, insulating spacer means fixed with said members and maintaining said base portions in a spaced relationship precluding severe mechanical stresses on said cell by said members, and means for making electrical circuit connections with said cell contacts through said conductive members; hollow duct means of insulating material disposed in surrounding and holding relationships with said cell assemblies; an enclosure having openings therein; means partitioning said enclosure into two air chambers each with openings to the ambient atmosphere; said duct means being positioned within said enclosure for air intake from one of said chambers and air exhaust into the other of said chambers; said openings in said one of said chambers being of area at least several times greater than the cross-sectional area of said duct means; and blower means forcing air through said duct means.

6. Current rectifier apparatus comprising a plurality of rectifier cell assemblies each including a unilaterally conductive cell having oppositely disposed electrical contacts and means intermediate said contacts sealing said cell, a pair of like extruded heat-dissipating members of conductive material each having a base portion and a plurality of substantially planar heat-dissipating fins integral with and projecting outwardly from said base portion at different angles, means electrically connecting said base portions of each of said members with a different one of said contacts such that said cell is sandwiched intermediate said base portions, said fins being of dimensions to impart a substantially right cylindrical general outline to the connected cell and members, and one of said fins of each of said members projecting outwardly beyond said outline to afford electrical bus connections at diametrically opposite positions, and a pair of planar insulating spacers fixed with said base portions parallel with the longitudinal axis of said outline to prevent mechanical stressing of said sandwiched sealed cell; duct means including at least one pair of substantially hemicylindrical hollow duct halves of insulating material; means clamping said duct halves about said rectifier cell assemblies to hold said assemblies in axially spaced relationships therewithin with said one fins projecting outwardly between said duct halves; an enclosure having openings therein; means partitioning said enclosure into two air chambers one above the other and each with said openings to the ambient atmosphere; said duct means being positioned within said enclosure for air intake from the upper one of said chambers and air exhaust into the lower one of said chambers; said openings in said upper chamber being of area at least several times greater than the cross-sectional area of said duct means; and blower means forcing air through said duct means.

7. Current rectifier apparatus for installation within a fluid stream for cooling purposes comprising: a unilaterally conductive cell having oppositely disposed electrical contacts and means intermediate said contacts hermetically sealing said cell, a pair of relatively massive channel-shaped heat-dissipating conductive members each having a base portion and a plurality of substantially planar heat-dissipating fins integral with and projecting outwardly from said base portion terminating at a substantially hemi-cylindrical outline, said fins being substantially parallel with the longitudinal axis of said outline, means electrically connecting said base portions of each of said members with a different one of said contacts such that said sealed cell is sandwiched intermediate said base portions of said members, spaced insulating spacers of a generally planar configuration fixed between said members parallel to said longitudinal axis on opposite sides of said sealed cell for maintaining said base portions in a spaced relationship precluding severe mechanical stresses on said cell and for permitting circulation of said cooling stream past said sealed cell between said insulating spacers, and means for making electrical circuit connections with said cell contacts through said conductive members.

8. The apparatus of claim 7 in which said means for making electrical circuit connections with said cell contacts comprises an additional generally planar fin on each of said conductive members projecting outwardly from said base portions beyond said hemi-cylindrical outline to provide an electrical bus connection.

References Cited in the file of this patent

UNITED STATES PATENTS

| | | |
|---|---|---|
| 1,751,360 | Ruben | Mar. 18, 1930 |
| 2,745,044 | Lingel | May 8, 1956 |
| 2,751,528 | Burton | June 19, 1956 |
| 2,815,472 | Jackson et al. | Dec. 3, 1957 |